United States Patent
Randall et al.

(10) Patent No.: US 11,151,039 B2
(45) Date of Patent: Oct. 19, 2021

(54) APPARATUS AND METHOD FOR MAINTAINING CACHE COHERENCE DATA FOR MEMORY BLOCKS OF DIFFERENT SIZE GRANULARITIES USING A SNOOP FILTER STORAGE COMPRISING AN N-WAY SET ASSOCIATIVE STORAGE STRUCTURE

(71) Applicant: Arm Limited, Cambridge (GB)

(72) Inventors: Joshua Randall, Austin, TX (US); Jesse Garrett Beu, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/821,271

(22) Filed: Mar. 17, 2020

(65) Prior Publication Data
US 2021/0294743 A1    Sep. 23, 2021

(51) Int. Cl.
*G06F 12/0815* (2016.01)
*G06F 12/0895* (2016.01)
(Continued)

(52) U.S. Cl.
CPC ...... *G06F 12/0815* (2013.01); *G06F 12/0246* (2013.01); *G06F 12/0884* (2013.01); *G06F 12/0895* (2013.01); *G06F 12/1441* (2013.01)

(58) Field of Classification Search
CPC ............. G06F 12/0815; G06F 12/1441; G06F 12/0895; G06F 12/0884; G06F 12/0246
(Continued)

(56) References Cited

U.S. PATENT DOCUMENTS

| 2011/0252200 A1* | 10/2011 | Hendry | G06F 12/0831 711/121 |
| 2017/0255557 A1* | 9/2017 | Robinson | G06F 12/0815 |

(Continued)

OTHER PUBLICATIONS

Alisafaee, "Spatiotemporal Coherence Tracking", 2012 IEEE/ACM 45th Annual International Symposium on Microarchitecture, pp. 341-350.
(Continued)

*Primary Examiner* — Hong C Kim
(74) *Attorney, Agent, or Firm* — Nixon & Vanderhye P.C.

(57) ABSTRACT

An apparatus is provided for receiving requests from a plurality of processing units, at least some of which may have associated cache storage. A snoop unit implements a cache coherency protocol when a request received by the apparatus identifies a cacheable memory address. Snoop filter storage is provided comprising an N-way set associative storage structure with a plurality of entries. Each entry stores coherence data for an associated address range identifying a memory block, and the coherence data is used to determine which cache storages need to be subjected to a snoop operation when implementing the cache coherency protocol in response to a received request. The snoop filter storage stores coherence data for memory blocks of at least a plurality P of different size granularities, and is organised as a plurality of at least P banks that are accessible in parallel, where each bank has entries within each of the N-ways of the snoop filter storage. The snoop control circuitry controls access to the snoop filter storage, and is responsive to a received address to create a group of indexes, the group of indexes comprising an index for each different size granularity amongst the P different size granularities, and each index in the group being constrained so as to identify an entry in a different bank of the snoop filter storage. The snoop control circuitry uses the group of
(Continued)

indexes to perform a lookup operation in parallel within the snoop filter storage in order to determine, taking into account each of the different size granularities, whether an entry stores coherence data for the received address.

19 Claims, 7 Drawing Sheets

(51) Int. Cl.
    *G06F 12/14*         (2006.01)
    *G06F 12/0884*    (2016.01)
    *G06F 12/02*         (2006.01)

(58) Field of Classification Search
    USPC .............................. 711/146, 142, 128, 118
    See application file for complete search history.

(56) References Cited

U.S. PATENT DOCUMENTS

2019/0042425 A1*  2/2019  Shifer .................. G06F 12/084
2019/0073304 A1*  3/2019  Jiang .................. G06F 12/0831
2019/0079868 A1*  3/2019  Jalal .................... G06F 12/0815

OTHER PUBLICATIONS

Zebchuk et al., "Multi-Grain Coherence Directories", MICRO'46 Dec. 7-11, 2013, pp. 359-370.

* cited by examiner

APPARATUS AND METHOD FOR MAINTAINING CACHE COHERENCE DATA FOR MEMORY BLOCKS OF DIFFERENT SIZE GRANULARITIES USING A SNOOP FILTER STORAGE COMPRISING AN N-WAY SET ASSOCIATIVE STORAGE STRUCTURE

BACKGROUND

The present technique relates to an apparatus and method for maintaining coherence data for memory blocks of different size granularities.

In a data processing system, data may be stored in memory, and accessed by issuing access requests identifying the addresses within memory of the data to be accessed. In order to improve access times, it is known to provide a cache hierarchy comprising multiple levels of cache, within which a subset of the data held in memory can be temporarily stored for quicker access by the processing units within the system.

A system may often have multiple processing units, and local caches can be provided in association with at least some of those processing units. This can give rise to an issue of coherency in respect of the data, in that it is important to ensure that each of the processing units accesses the most up to date version of the data.

In order to handle the issue of data coherency, a snoop unit may be provided to implement a cache coherency protocol so as to ensure that, in response to a request specifying a cacheable address, the most up to date data is accessed. The snoop unit may have snoop filter storage providing multiple entries, where each entry is used to store coherence data for an associated address range identifying a memory block. The coherence data can be used to work out, for a particular specified address, which of the local cache storages provided in association with the various processing units may need to be subjected to a snoop operation when implementing the cache coherency protocol.

The snoop filter storage will have a finite number of entries for storing coherence data, and it is hence desirable to make efficient use of those available entries. One technique that can be used to seek to increase the amount of coherence data that can be provided within a snoop filter storage of a predetermined size is to allow coherence data for memory blocks of different size granularities to be stored within the entries. However, this can impact efficiency when seeking to perform lookups within the snoop filter storage in order to determine whether there is coherence data for a specified address.

SUMMARY

In one example configuration, there is provided an apparatus to receive requests from a plurality of processing units, where multiple of the plurality of processing units have associated cache storage, the apparatus comprising: a snoop unit to implement a cache coherency protocol when a request received by the apparatus identifies a cacheable address within memory; the snoop unit having snoop filter storage comprising an N-way set associative storage structure having a plurality of entries, where each entry is used to store coherence data for an associated address range identifying a memory block, and the coherence data is used to determine which cache storages provided within the multiple processing units need to be subjected to a snoop operation when implementing the cache coherency protocol in response to a received request specifying an address within the associated address range; wherein: the snoop filter storage is arranged to store coherence data for memory blocks of at least a plurality P of different size granularities; the snoop filter storage is organised as a plurality of banks that are accessible in parallel, wherein the plurality of banks comprises at least P banks, and each bank comprises entries within each of the N ways of the snoop filter storage; and the snoop unit further comprises snoop control circuitry to control access to the snoop filter storage, wherein the snoop control circuitry is responsive to a received address to create from the received address a group of indexes, the group of indexes comprising an index for each different size granularity amongst the P different size granularities, and each index in the group being constrained so as to identify an entry in a different bank of the snoop filter storage to the bank containing the entry identified by any other index in the group; and the snoop control circuitry is arranged to use the group of indexes to perform a lookup operation in parallel within the snoop filter storage in order to determine, taking into account each of the different size granularities amongst the P different size granularities, whether an entry stores coherence data for the received address.

In another example configuration, there is provided a method of maintaining, within an apparatus, coherence data for memory blocks of different size granularities, comprising: receiving at the apparatus requests from a plurality of processing units, where multiple of the plurality of processing units have associated cache storage; employing a snoop unit to implement a cache coherency protocol when a request received by the apparatus identifies a cacheable address within memory; providing snoop filter storage comprising an N-way set associative storage structure having a plurality of entries; employing each entry in the snoop filter storage to store coherence data for an associated address range identifying a memory block, where the coherence data is used to determine which cache storages provided within the multiple processing units need to be subjected to a snoop operation when implementing the cache coherency protocol in response to a received request specifying an address within the associated address range; arranging the snoop filter storage to store coherence data for memory blocks of at least a plurality P of different size granularities; organising the snoop filter storage as a plurality of banks that are accessible in parallel, wherein the plurality of banks comprises at least P banks, and each bank comprises entries within each of the N ways of the snoop filter storage; and employing snoop control circuitry to control access to the snoop filter storage, wherein the snoop control circuitry, responsive to a received address, creates from the received address a group of indexes, the group of indexes comprising an index for each different size granularity amongst the P different size granularities, and each index in the group being constrained so as to identify an entry in a different bank of the snoop filter storage to the bank containing the entry identified by any other index in the group; and using the group of indexes to perform a lookup operation in parallel within the snoop filter storage in order to determine, taking into account each of the different size granularities amongst the P different size granularities, whether an entry stores coherence data for the received address.

In a still further example configuration, there is provided an apparatus to receive requests from a plurality of processing units, where multiple of the plurality of processing units have associated cache storage, the apparatus comprising: snoop means for implementing a cache coherency protocol when a request received by the apparatus identifies a cacheable address within memory; the snoop means having snoop filter storage means comprising an N-way set associative storage structure having a plurality of entries, where each entry is used to store coherence data for an associated address range identifying a memory block, and the coherence data is used to determine which cache storages provided within the multiple processing units need to be subjected to a snoop operation when implementing the cache coherency protocol in response to a received request specifying an address within the associated address range; wherein: the snoop filter storage means is for storing coherence data for memory blocks of at least a plurality P of different size granularities; the snoop filter storage means is organised as a plurality of banks that are accessible in parallel, wherein the plurality of banks comprises at least P banks, and each bank comprises entries within each of the N ways of the snoop filter storage means; and the snoop means further comprises snoop control means for controlling access to the snoop filter storage means, wherein the snoop control means is responsive to a received address to create from the received address a group of indexes, the group of indexes comprising an index for each different size granularity amongst the P different size granularities, and each index in the group being constrained so as to identify an entry in a different bank of the snoop filter storage to the bank containing the entry identified by any other index in the group; and the snoop control means is arranged to use the group of indexes to perform a lookup operation in parallel within the snoop filter storage means in order to determine, taking into account each of the different size granularities amongst the P different size granularities, whether an entry stores coherence data for the received address.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

As mentioned earlier, one technique that can be used to seek to increase the amount of coherence data that can be provided within a snoop filter storage of a predetermined size is to allow coherence data for memory blocks of different size granularities to be stored within the entries. For example, whilst an entry may be used to store coherence data for a memory block corresponding to a cache line sized block of data, in some instances it may be possible within a single entry to store coherence data for a memory block relating to a larger size granularity, for example relating to multiple cache line's worth of data. In addition to increasing the effective capacity of the snoop filter storage, such an approach can also reduce the likelihood of needing to evict coherence data from the snoop filter storage, which can provide significant performance benefits.

However, once it has been decided to allow the snoop filter storage to be used to store coherence data for memory blocks of different size granularities, an issue that then arises is how to efficiently perform lookups within the snoop filter storage in order to determine whether there is coherence data for a specified address. In particular, it is desirable to avoid the need to perform sequential lookups for each possible size granularity, but to retain flexibility as to how the available entries can be used for storing coherence data for memory blocks of different size granularities. The techniques described herein seek to alleviate such issues.

In accordance with one example arrangement, an apparatus is provided for receiving requests from a plurality of processing units, where multiple of those processing units (but not necessarily all of them) have associated cache storage. The apparatus provides a snoop unit for implementing a cache coherency protocol when a request received by the apparatus identifies a cacheable address within memory. The snoop unit has a snoop filter storage comprising an N-way set associative storage structure having a plurality of entries. Each entry is used to store coherence data for an associated address range identifying a memory block. The coherence data is used to determine which cache storages provided within the multiple processing units need to be subjected to a snoop operation when implementing the cache coherence protocol in response to a received request specifying an address within the associated address range.

The snoop filter storage is arranged to store coherence data for memory blocks of at least a plurality P of different size granularities. Further, the snoop filter storage is organised as a plurality of banks that are accessible in parallel, wherein the plurality of banks comprise at least P banks, and each bank comprises entries within each of the N ways of the snoop filter storage.

The snoop unit further comprises snoop control circuitry that controls access to the snoop filter storage. The snoop control circuitry is arranged to be responsive to a received address to create from the received address a group of indexes. The group of indexes comprise an index for each different size granularity amongst the P different size granularities, and each index in the group is constrained so as to identify an entry in a different bank of the snoop filter storage to the bank containing the entry identified by any other index in the group. As a result, the snoop control circuitry can then be arranged to use the group of indexes to perform a lookup operation in parallel within the snoop filter storage in order to determine, taking into account each of the different size granularities amongst the P different size granularities, whether an entry stores coherence data for the received address.

By virtue of the above technique, a lookup operation can be performed in parallel for coherence data associated with memory blocks of up to P different size granularities. In situations where the total number of supported size granularities within the snoop filter storage does not exceed P, this means that a single iteration of lookup operations is all that is required in order to determine whether any entry stores coherence data for the received address.

In situations where the total number of supported size granularities exceeds P, then it will be appreciated that a single iteration of lookup operations can be performed for multiple different size granularities up to P, and accordingly in a first lookup iteration a lookup can be performed using up to P indexes, and then in a subsequent lookup iteration a lookup can be performed for up to a further P different indexes relating to further size granularities not covered by the first lookup iteration.

It has been found that such an approach provides a simple and efficient mechanism for retaining the flexibility in how individual entries within the snoop filter storage are used (in one example implementation allowing any entry to be used for coherence data associated with any of the supported size granularities), whilst also providing a very efficient mechanism for performing a lookup within the snoop filter storage.

There are a number of ways in which the group of indexes can be generated for a received address. However, in one example implementation each index in the group of indexes comprises one or more bank specifying bits, and the snoop control circuitry is arranged to manipulate the one or more bank specifying bits to ensure that each index in the group identifies an entry in a different bank of the snoop filter storage to the bank containing the entry identified by any other index in the group.

The different supported size granularities can take a variety of forms, but in one example the different size granularities comprise a first size corresponding to a cache line size, and at least one further size corresponding to a multiple of the cache line size. By allowing, in certain situations, a single entry in the snoop filter storage to be allocated to store coherence data for a memory block that corresponds to a multiple of the cache line size, this can enable much more efficient utilisation of the available snoop filter storage, whilst the techniques described herein allow for lookup operations to be performed efficiently within the snoop filter storage even though coherence data for multiple different size granularities is supported.

In one example implementation the received address has an index portion comprising a plurality of bits and a tag portion comprising a plurality of further bits. The snoop control circuitry may be arranged to generate the index for the first size (i.e. the cache line size) using the plurality of bits of the index portion of the received address. For each further size, the snoop control circuitry can then be arranged use a subset of the plurality of bits of the index portion, along with one or more of the further bits of the tag portion, in order to generate an initial index for the further size that has the same number of bits as the index for the first size. The snoop control circuitry can then manipulate one or more bank specifying bits in the generated indexes in order to ensure that each index in the group of the indexes identifies a different bank to each other index in the group of indexes.

In one example implementation, it could be the case that the index generated for the first size (i.e. the cache line size) is amongst the indexes whose bank specifying bits are manipulated. However, in one example implementation the index for the first size is left unaltered and, for each initial index generated for each further size, the snoop control circuitry is arranged to manipulate the one or more bank specifying in that initial index in order to generate a final index used as the index for the corresponding further size in the group of indexes.

For each further size granularity supported, the way in which the further bits of the tag portion are used when generating the initial index for that further size may vary dependent on implementation. In one example implementation those further bits of the tag portion are used to replace a corresponding number of deselected bits from the index portion. The bits of the index portion that are deselected may vary dependent on implementation, but in one example, for each further size, the snoop control circuitry is arranged to replace one or more least significant bits of the index portion of the received address with a corresponding number of further bits from the tag portion of the received address in order to generate the initial index for that further size.

The manner in which the bank specifying bits are formed for each index can vary dependent on implementation, but in one example implementation the one or more bank specifying bits in each initial index are copied from corresponding bits in the index for the first size. The bank specifying bits may be placed in a variety of locations within the indexes, but in one example implementation the one or more bank specifying bits are one or more most significant bits in the index for the first size, and those bank specifying bits are then copied when forming each initial index for each further size.

Whilst in one example implementation there may be multiple further sizes, in one particular implementation the different size granularities comprise the first size and a single further size. In such an implementation, the one or more bank specifying bits may comprise a single bank specifying bit. The snoop control circuitry may then be arranged to manipulate the single bank specifying bit by inverting a value of the single bank specifying bit in either the index for the first size or the initial index for the further size.

There are a number of ways in which the information stored in each entry can be marked to identify the type of coherence data stored therein. In one example implementation, each entry includes a granularity field used to identify the size granularity that the coherence data stored in that entry relates to.

In one example implementation, the snoop control circuitry may be arranged in response to detecting that an allocation is required for an identified address and size granularity, to control allocation, in the snoop filter storage, of an entry to maintain coherence data for the identified address and size granularity. The snoop control circuitry may be arranged to apply a set determination operation to determine, from the identified address and the size granularity, an index identifying a target set within a target bank of the snoop filter storage from which the allocated entry is to be selected. The set determination operation may be such that, for any identified address, the target bank differs depending on the size granularity, but with the target bank for any particular size granularity being dependent on the identified address. Hence, by such an approach, for any particular address, different banks will be selected depending on the size granularity to which the coherence data will relate, but that target bank selection will also be influenced by the address itself. Hence, whilst for one specified address bank 0 may be selected for allocation when storing coherence data for a cache line sized memory block, and bank 1 might be selected for allocation when storing coherence data for a larger sized memory block, the opposite may be true for a different specified address.

In one example implementation, the plurality of banks comprises K×P banks, where K is an integer of one or more. In one example implementation, there may be exactly P banks provided. However, in alternative implementations, larger multiples of P banks may be provided, and this could then support parallel performance of K lookups using standard banking techniques for supporting those K lookups. For any individual lookup, the techniques described herein can be used, hence allowing, for each lookup, lookup operations to be performed in parallel within the snoop filter storage in order to determine, taking into account each of the different size granularities amongst the P different size granularities, whether an entry stores coherence data.

The way in which the coherence data is maintained within the entries may take a variety of forms. In one example implementation, within an entry in the snoop filter storage used to maintain coherence data for a cache line size memory block, the coherence data provides a presence flag for each of the multiple processing units to identify when the cache storage of that processing unit is known not to hold a copy of the data within the associated address range. This can enable certain processing units to be excluded from the snoop operation.

As another example of how the coherence data may be maintained, then in accordance with one example implementation, within an entry in the snoop filter storage used to maintain coherence data for a further size corresponding to a multiple of the cache line size, the coherence data may provide an indication of a single processing unit amongst the multiple processing units that currently has private access to the data within the associated address range. Hence, in this example implementation, coherence data for an enlarged size corresponding to multiple cache lines is used when the data within that enlarged block is only being used by a single processing unit, and the coherence data identifies which processing unit is the processing unit that has private access to that data.

In some example implementations, the coherence data may further comprise presence information identifying which cache line size memory blocks within the associated address range are currently cached by the single processing unit. Hence, even though the coherence data relates to an enlarged block comprising multiple cache lines, the coherence data can identify which cache lines within that enlarged block are actually cached by the single processing unit.

It should be noted that the techniques described herein can also be employed within a sliced snoop circuitry arrangement. In particular, the apparatus may further comprise at least one additional snoop unit arranged to operate in combination with the snoop unit to provide sliced snoop circuitry, with a memory address space being considered as a plurality of slices, and each slice being associated with one snoop unit selected from amongst the snoop unit and that least one additional snoop unit. In one example implementation, each additional snoop unit has a same form as the snoop unit, and hence each snoop unit can employ the techniques described herein. In accordance with one example implementation, the interleaving granularity of the slices is greater than or equal to a maximum size granularity amongst the different size granularities of the memory blocks, thereby ensuring that the coherence data for each memory block can be maintained within a single snoop unit.

Particular examples will now be described with reference to the Figures.

Figure 1:
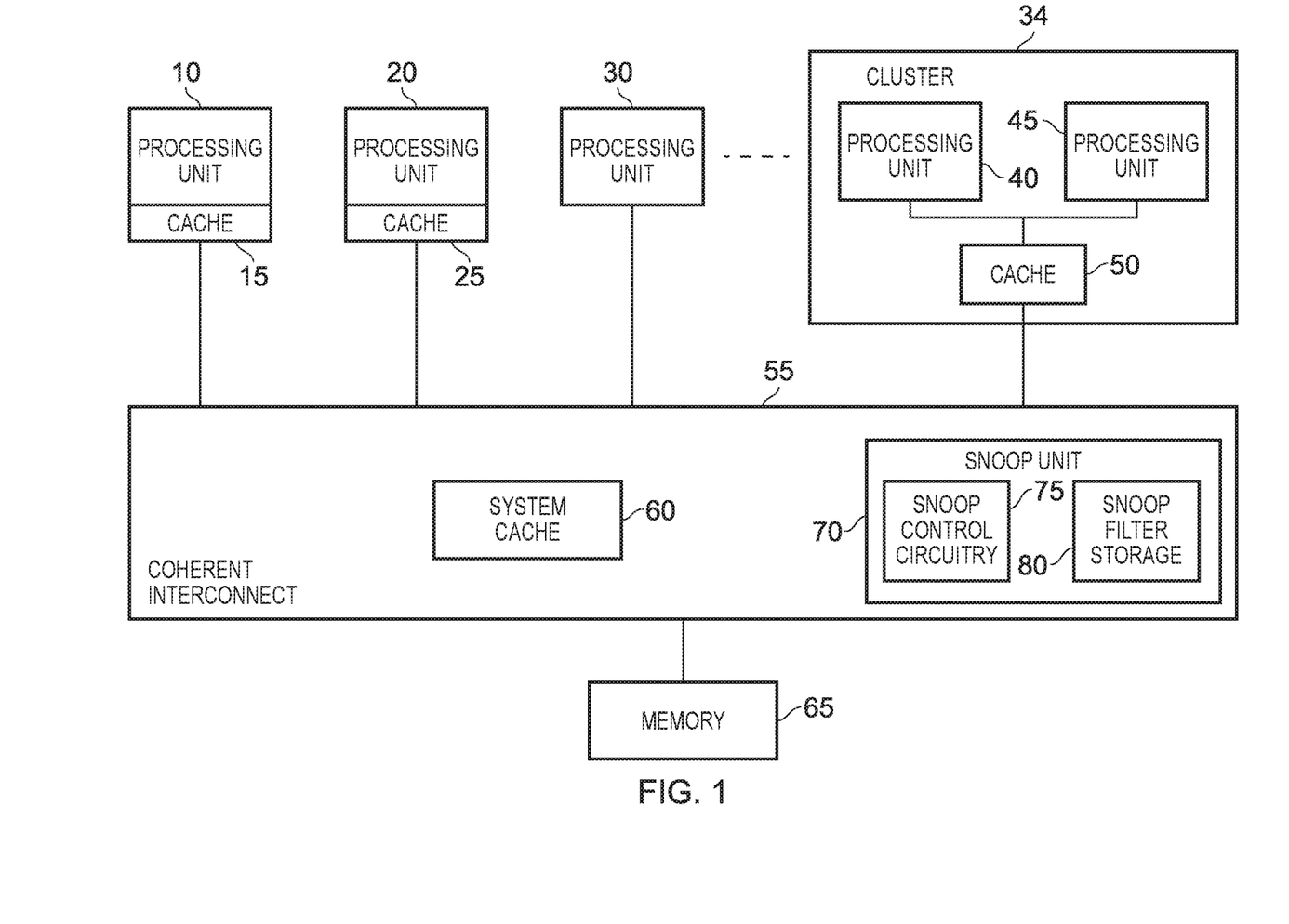
FIG. 1 is a block diagram of a system in accordance with one example arrangement.

FIG. 1 is a block diagram of a system in accordance with one example implementation. A plurality of processing units 10, 20, 30, 40, 45 are coupled to a coherent interconnect 55 via which they can access a plurality of slave devices (not explicitly shown in the figure), where one of those slave devices may be a memory controller for controlling access to memory 65. Each of the processing units 10, 20, 40, 45 has associated cache 15, 25, 50 for storing cached versions of data from the memory 65. However, it is not essential for each processing unit to have an associated local cache structure, and one or more of the processing units may not have a local cache structure (such as processing unit 30 shown in FIG. 1). In addition to the local cache structures, one or more shared cache structures may also be provided, such as the system cache 60.

Whilst the various processing units connected to the interconnect 55 may be individual processing units, such as a central processing unit (CPU) or a graphics processing unit (GPU), it is possible that one or more of the processing units may effectively form a subsystem/cluster, consisting of multiple individual processing units which may for example have access to a shared cache structure, as illustrated by way of example with reference to the subsystem 34 comprising the processing units 40, 45 that share a local cache structure 50. In one specific example the subsystem takes the form of a multi-threaded processor core, and the individual processing units 40, 45 therein are separate threads.

Whenever the system includes processing units that have an associated local cache structure, it will typically be necessary for the interconnect to implement a cache coherency protocol to ensure that the various processing units coupled to the interconnect will always see the most up-to-date version of any particular data item. To assist in implementing the cache coherency protocol, the coherent interconnect 55 includes a snoop unit 70 which aims to keep track, for each of a number of different memory blocks, of which processing units have accessed addresses within those memory blocks, thus identifying which processing units may hold cached copies of data relating to those memory blocks. When it is determined that a coherency action is required, the snoop unit 70 is used to determine which caches associated with the processing units should be subjected to a snoop operation in order to determine information about the data cached within those caches for a particular memory address.

In particular, a snoop request can be issued from the snoop unit to such a cache specifying a snoop address, causing a lookup to be performed within the cache, and information returned to the snoop unit indicative of the result of that lookup. There will typically be local coherency control circuitry in association with each of the caches that can take an appropriate action in response to the snoop request. In particular, if a hit is detected, then dependent on the cache coherency protocol being used and the type of snoop request, it may be appropriate for the local cache to invalidate the cache line containing a copy of the data and to return its copy of the data to the snoop unit as part of a snoop response. Alternatively, it may return the data to the snoop unit without invalidating its copy. Further, in other examples, it may merely need to invalidate the cache line containing a copy of the data, without needing to return its copy of the data to the snoop unit.

When an access request is issued by one of the processing units seeking to access data at a memory address specified by the access request, and a hit is not detected in any local cache structure of that processing unit, then that access request may be propagated on to the snoop unit 70. It should be noted that that access request may still be propagated on to the snoop unit even if there is a hit in a local cache, depending on the type of access that the processing unit is seeking to perform. For example, if the originating processing unit (i.e. the processing unit issuing the access request) is seeking to perform a write access, and a hit is detected in its local cache, it may be appropriate to determine whether any of the other processing units also have a local cached copy, by reference to the snoop unit 70, since those copies will become out of data once the write access has been performed to the originating processing unit's local cache, and hence it may be considered appropriate to invalidate any other processing unit's local copies at the time the write access is being performed to the originating processing unit's local cache.

Whenever an access request is received by the snoop unit 70, then snoop control circuitry 75 within the snoop unit 70 is used to determine whether any snoop operations are required, and if so to issue snoop requests to the relevant processing units to cause snoop operations to be performed, during which their local cache structures will be accessed as discussed earlier and any appropriate coherency action taken, resulting in the provision of a snoop response back to the snoop unit.

Rather than merely broadcasting a snoop request to every processing unit that has an associated local cache structure, the snoop unit 70 has snoop filter storage 80 that provides a plurality of entries, where each entry is arranged to identify a memory block, and to maintain coherence data indicative of the processing units that have accessed that memory block. The memory block identified in each snoop filter entry can take a variety of forms. In one example implementation, multiple memory block size granularities are supported, including a memory block corresponding to a cache line sized block of data, and one or more larger sized memory blocks (which may for example relate to multiples of the cache line size). When coherence data is allocated into an entry of the snoop filter storage, a granularity indication can be provided in the entry to identify the size granularity that the coherence data in that entry relates to, and an address indication will also be provided in the entry to identify the address range that the coherence data relates to.

When an access request is received at the snoop unit 70, the snoop control circuitry 75 can perform a lookup within the snoop filter storage 80 using the memory address specified by the access request in order to determine whether there is a hit in any of the snoop filter entries, i.e. whether the memory address is an address within the memory block associated with a particular snoop filter entry. If so, then the coherence data can be retrieved from that snoop filter entry in order to determine which of the processing units are to be subjected to a snoop operation. The various entries in the snoop filter storage are updated as each access request is performed by the processing units, so as to seek to maintain information about the processing units that have accessed particular memory blocks being tracked within the snoop filter storage. By such an approach, this can significantly reduce the number of snoop operations that need to be performed, relative to an approach which merely speculatively broadcasts snoop requests to all of the processing units.

In accordance with the techniques described herein, the snoop filter storage is arranged so as to allow coherence data for memory blocks of different size granularities to be stored within its entries, to thereby increase the effective capacity of the snoop filter storage. One supported size granularity is that of a cache line. Accordingly, for a cache line sized memory block, coherence data can be captured within an entry of the snoop filter storage to seek to identify which processing units have cached that data in their local cache structures. However, at least one larger memory block size is also supported, in one example implementation there being a single such larger memory block size that corresponds to the size of multiple cache lines. This can for example be useful when a range of addresses defining such a larger memory block size is being used solely by one processing unit, since in that instance coherence data can be allocated into the snoop filter storage to identify the single processing unit that currently has access to that range of addresses, and optionally to identify which cache line sized blocks of data within that address range have been cached by that identified processing unit's local cache. This can avoid the need to use separate entries of the snoop filter storage for each cache line sized block of data within that address range that has been cached by the processing unit.

In order to make most effective use of the available resources of the snoop filter storage, it is desirable not to restrict which entries are used for which types of coherence data, since the number of entries utilised for storing coherence data for cache line sized memory blocks, and the number of entries used to store coherence data for enlarged sized memory blocks may vary over time, dependent on the activities of the processing units within the system. However, it is also important to provide an efficient mechanism for detecting, for any specified address, whether any of the entries store coherence data for that address, and in particular it is desirable to avoid having to perform serial lookups within the snoop filter storage for each possible size granularity supported, as this could significantly impact performance. In accordance with the techniques described herein, an efficient mechanism is provided that allows for flexible utilisation of the entries within the snoop filter storage, whilst allowing lookup operations to be performed in parallel within the snoop filter storage in order to detect the presence of coherence data relating to multiple different size granularities.

Figure 2:
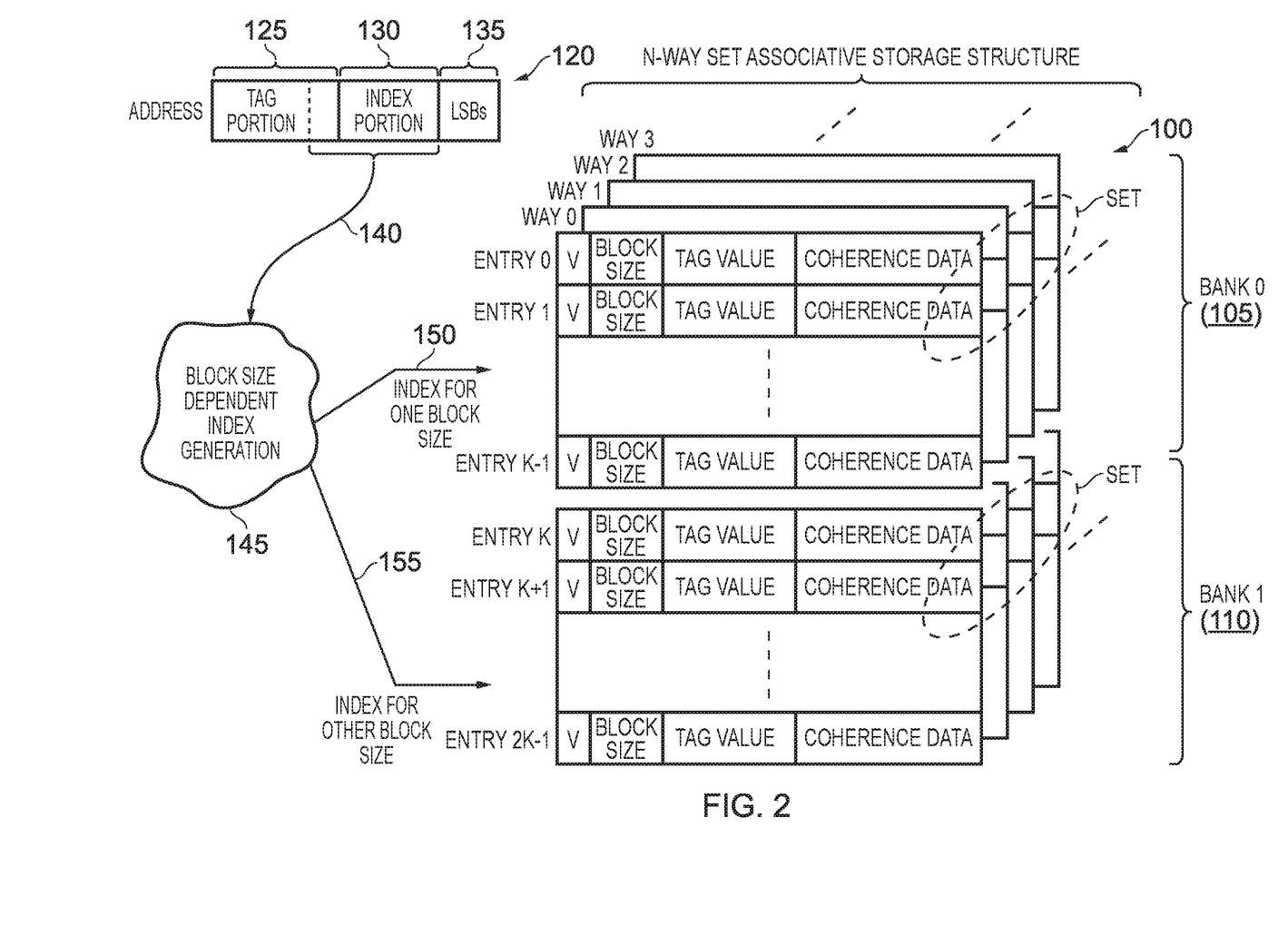
FIG. 2 is a diagram schematically illustrating how the techniques described herein cause multiple indexes to be generated for a received address, with each of the indexes pointing to a different bank within the snoop filter storage.

The technique used herein is schematically illustrated in FIG. 2. In particular, the snoop filter storage comprises an N-way set associative storage structure 100 having a plurality of entries. Each set within the snoop filter storage is formed by an entry in each of the ways. Each entry is used to store coherence data for an associated address range that is identified by a tag value. The tag value is determined from a tag portion of an address, with the number of bits required for the tag value depending on the size of the memory block to which the coherence data relates. In particular, as the memory block size granularity increases, then the number of bits required for the tag value reduces accordingly.

As also shown in FIG. 2, each entry includes a block size indication to identify the size granularity of the address region to which the coherence data stored in that entry of the snoop filter storage relates. In addition, a valid bit is provided to identify whether the entry currently stores valid coherence data or not.

As shown in FIG. 2, each received address 120 consists of a tag portion 125, an index portion 130 and a certain number of least significant bits 135. The least significant bits 135 are used to identify individual data values within a cache line sized block of data, whilst the index portion 130 comprises a number of bits that can be used to distinguish between different cache line sized blocks of data that all share a common tag portion 125.

As shown in FIG. 2, the N-way set associative storage structure 100 is organised as a plurality of banks 105, 110. The snoop filter storage may be arranged to store coherence data for memory blocks of at least P different size granularities, where a lookup operation can be performed in parallel for P different size granularities. The number of banks then provided comprises at least P banks, and each of the banks can be accessed in parallel. In one particular example implementation, the snoop filter storage supports two different size granularities, the first corresponding to a cache line sized memory block and the second size granularity relating to an enlarged sized memory block corresponding to multiple cache lines. The snoop storage then contains a number of banks that is multiple of two, and in the example shown in FIG. 2 consists of two banks 105, 110. If a larger multiple of P banks were provided, then this could then support parallel performance of lookups for different specified addresses, using standard banking techniques for supporting those lookups. For any individual lookup, the techniques described herein to allow lookup operations to be performed in parallel for multiple different size granularities can then be performed.

As shown in FIG. 2, an index generation function 145 is provided that uses some of the address bits of the address 120 in order to generate a group of indexes, where that group of indexes comprises an index for each of the P size granularities for which a lookup operation is going to be performed in parallel. For a cache line sized memory block, the index portion 130 of the address can be used in order to generate an index. As will be discussed in more detail later, for a larger block size, some bits from the index portion 130 can be dropped, and replaced by selected bits from the tag portion 125, and the resultant bits are then used by the index generation function 145 to generate an initial index for the larger block size. However, in addition, each index will have one or more bank specifying bits, the number of bits required being dependent on the number of banks provided within the storage structure. Hence, considering the example of FIG. 2, a single bank specifying bit may be provided within each index to distinguish between the two different banks. The index generation function 145 manipulates the index bits of the various indexes within the index group generated, so as to ensure that each index points to a different bank.

Hence, as shown in FIG. 2, for any specified address 120, the index generation function 145 will generate a first index 150 that identifies a set within bank zero 105, and a second index 155 that specifies a set within bank one 110. It should be noted that, whilst for some addresses, the index that is generated for the cache line sized block may point to a set in bank zero, and the index generated for the larger block size may point to a set in bank one, the opposite may be true for other addresses. A similar scheme is used at the time of allocating new coherence data into the snoop filter storage, and hence it will be appreciated that coherence data for cache line sized blocks may be allocated in either bank, and coherence data for the larger memory block size may also be allocated in either bank. However, for any particular allocation, the bank that is used for the coherence data being allocated will be fixed dependent on the range of addresses to which that coherence data relates and the size granularity to which that coherence data relates.

Figure 3:
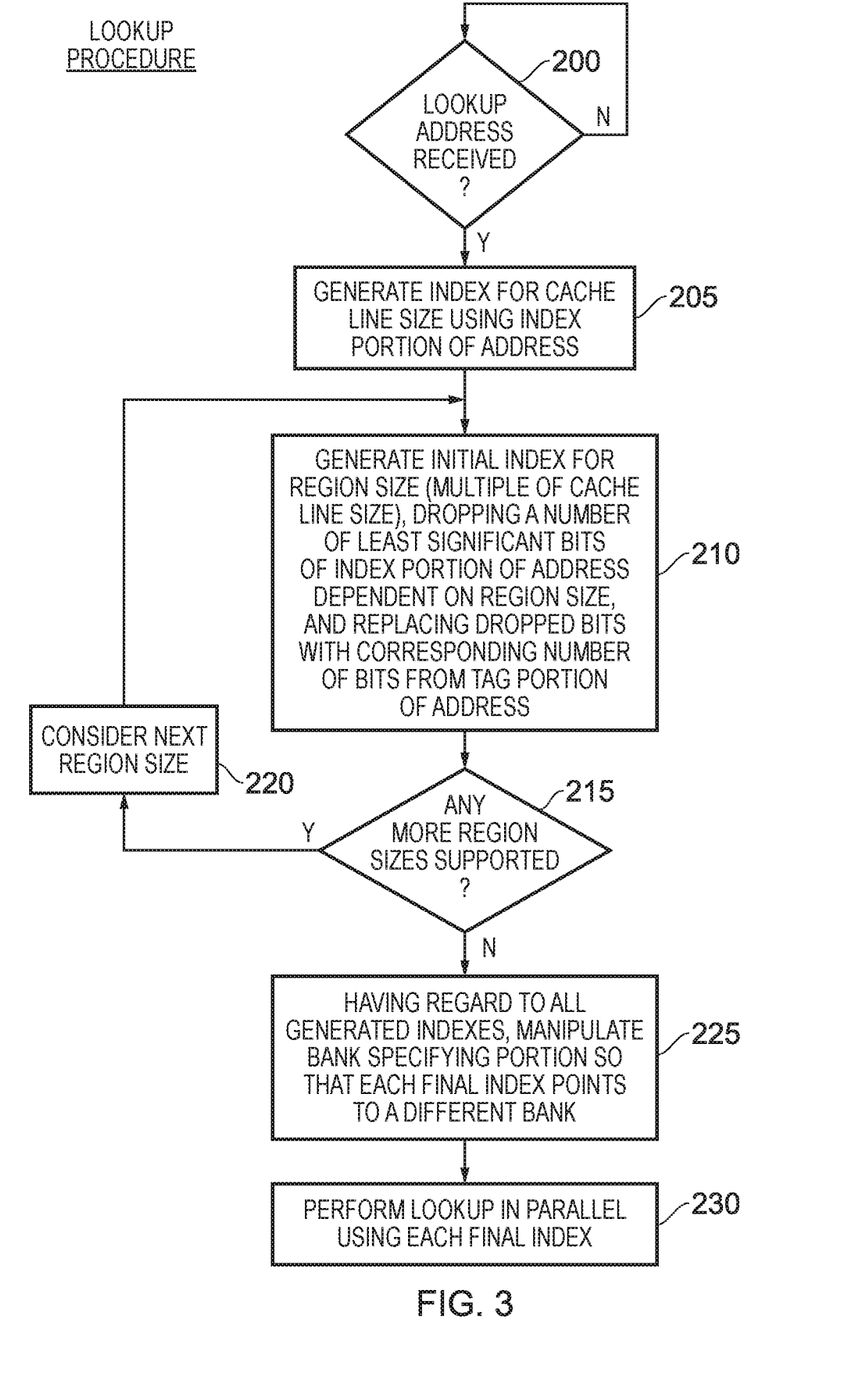
FIG. 3 is a flow diagram illustrating the steps performed during a lookup procedure in accordance with one example implementation.

FIG. 3 is a flow diagram illustrating the lookup procedure in accordance with one example implementation. At step 200, a lookup address is received, and thereafter at step 205 an index is generated for the cache line sized block using the index portion of the received address.

At step 210, an initial index is generated for the enlarged memory block size, this also being referred to herein as a region size, and assumed to be a size that corresponds to multiple cache lines. To generate the initial index, a number of bits of the index portion of the address are dropped, the number of bits dropped being dependent on the region size. In the example illustrated in FIG. 3, it is the least significant bits of the index portion that are dropped, but in alternative implementations a different selection of bits from the index portion could be chosen to be dropped. The dropped bits are then replaced with a corresponding number of bits chosen from the tag portion of the address. Whilst the bits chosen from the tag portion may be varied dependent on implementation, in one example implementation a certain number of least significant bits of the tag portion are selected for this purpose.

At step 215, it is determined whether any more region sizes are supported, and if so then at step 220 the next region size is considered and the process returns to step 210.

It will be appreciated that whilst, for ease of illustration, steps 205, 210, 215, 220 have been shown as a serial sequence of steps, in an alternative implementation each of the indexes could be generated in parallel.

Once all of the indexes have been generated, then at step 225 the bank specifying portion of the indexes are manipulated so that each final index points to a different bank. Thereafter, at step 230, a lookup is performed in parallel using each of the final indexes.

By such an approach, lookup operations can be performed in parallel using the various indexes in the index group to seek to find an entry that stores coherence data for the received address, taking into account up to P different size granularities, with the snoop storage comprising at least P banks. In situations where P is equal to the maximum number of supported size granularities, then this means that a single lookup process is performed for all of the supported size granularities, hence significantly improving performance. In an alternative implementation, it may be that the number of supported size granularities is larger than P, and in that event first lookup operations can be performed in parallel for up to P different size granularities, and then subsequent lookup operations can be performed in parallel for up to another P further different size granularities, this process being repeated until all of the supported size granularities have been checked. Whilst this may mean that more than one round of lookups is required, it will be appreciated that it significantly increases performance since each round of lookup performs a lookup operation in parallel for up to P different size granularities.

Figure 4:
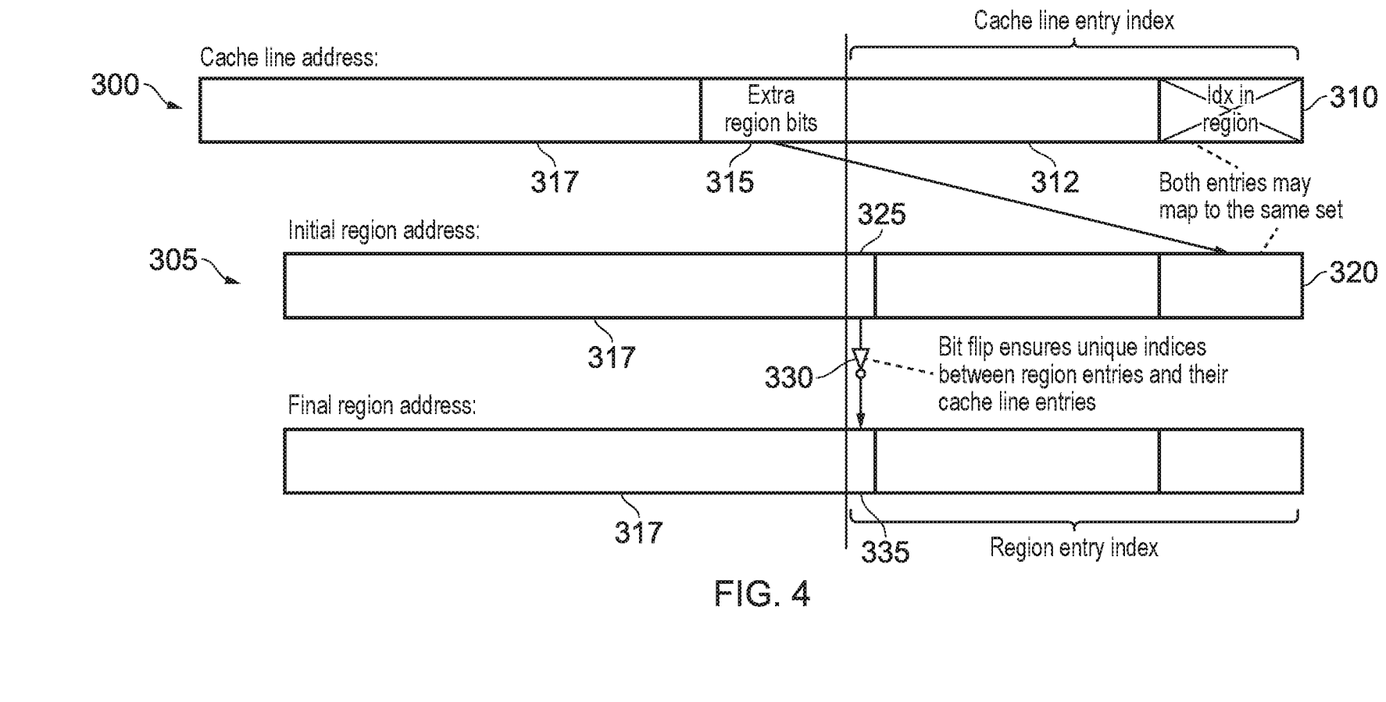
FIG. 4 schematically illustrates how indexes into the snoop filter storage can be generated in accordance with one particular example implementation.

FIG. 4 illustrates one specific way in which a region entry index can be generated by the index generation function 145, so as to have a bank specifying bit that differs to that of the corresponding cache line entry index generated by the index generation function. An address 300 is received, and a cache line entry index is generated using the index portion of the address, this being formed by the portions 310 and 312 shown in FIG. 4. To simplify the illustration, the least significant bits of the address identifying individual data values within a cache line are omitted from the illustrated address 300. When a lookup is subsequently performed using the cache line entry index, this will identify a set within the snoop filter storage, and it will then be determined whether any of the entries in that set store valid coherence data for a cache line sized block. If so, the tag value in the identified entry will be compared against the tag portion of the address formed by the portions 315 and 317, and if there is a match this will indicate that coherence data has been found for the specified address.

As mentioned earlier, less tag bits are required to identify a region address, due to the larger size of a region relative to a cache line. In particular, a certain number of the tag portion bits 315 are not required. In the example shown in FIG. 4, when generating a region entry index, a certain number of bits 310 from the index portion of the address are dropped, and are replaced by an equivalent number of extra region bits taken from the tag portion of the address, indicated in FIG. 4 as the bits 315. These bits are hence used to form the portion 320 within the initial region address 305. The remaining bits within the index portion are then copied over from the corresponding bits in the original cache line address, and the tag portion is shortened, using only the bits 317.

As a result, the bank specifying bit will be identical in the initial region address to the bank specifying bit in the cache line address. In the example shown in FIG. 4, the bank specifying bit is the most significant bit 325 of the index portion of the address. The index generation function 145 the performs a manipulation of the bank specifying bit, in this case a simple inversion as indicated by the inverter 330, in order to generate a modified bank specifying bit 335 which points to the opposite bank to the bank pointed to by the cache line entry index. Accordingly, it will be seen that the region entry index has the same number of bits as the cache line entry index, but will point to a different bank to the bank specified by the cache line entry index. With reference to the earlier discussed example of FIG. 2, then the cache line entry index may point to either bank zero 105 or bank one 110, dependent on the index portion of the address, but in either event the region entry index will point to the opposite bank, and accordingly a lookup can be performed in parallel to seek to find coherence data for the specified address, whether that coherence data be for a cache line sized block or a region sized block.

Figure 5:
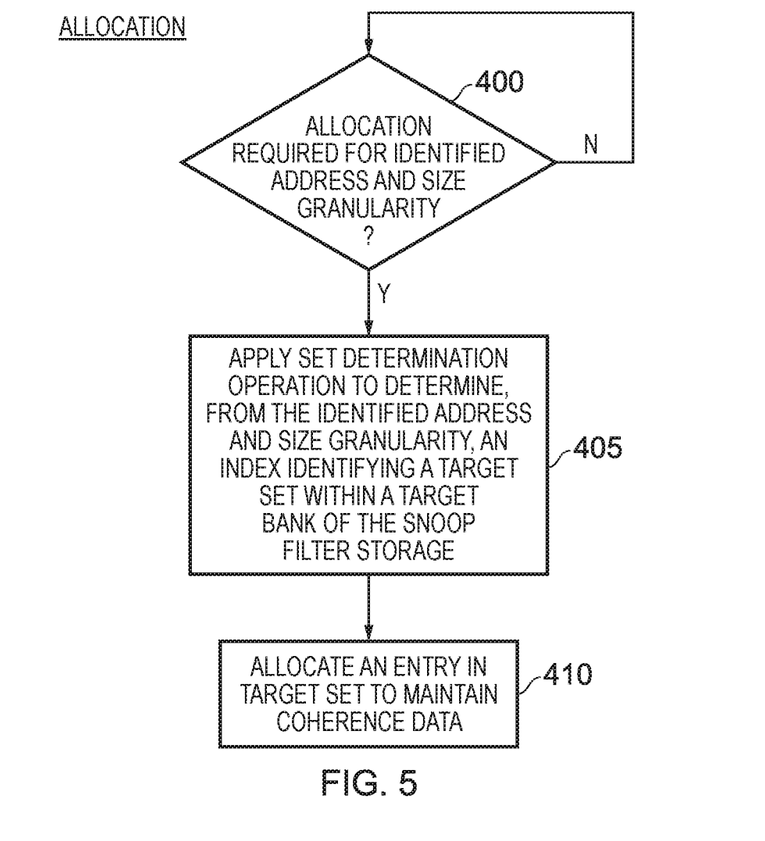
FIG. 5 is a flow diagram illustrating an allocation process that can be used in order to allocate coherence data into an entry of the snoop filter storage, in accordance with one example implementation.

FIG. 5 is a flow diagram illustrating an allocation process in accordance with one example implementation. Typically, an allocation will occur when a lookup is performed in the snoop filter storage for a specified address, and no hit is detected. In that event, the requested data will typically be retrieved from memory (or from lower level caches in the cache hierarchy between the snoop unit and memory) and returned to the requesting processing unit, where it may then be cached within the local cache. Accordingly it is appropriate at that point to allocate an entry within the snoop filter storage to track coherence data for that data. In one example implementation, at the time of initial allocation, coherence data associated with the region size may be allocated, assuming at the time of allocation only the single requesting processing unit is accessing the data. However, if by the time of allocation other processing units are also requesting data within that region, then an allocation of coherence data for a cache line sized block will instead be made. Further, it will be appreciated that, for coherence data allocated for a region size, then when in due course any other processing unit requests access to the data, so that the data is no longer uniquely owned by a single processing unit, it may be necessary to invalidate the coherence data associated with the region size, and instead create one or more new items of coherence data associated with individual cache line sized blocks within that region, for allocation within entries of the snoop filter storage.

Whatever the reason for the allocation occurring, when at step 400 it is determined that an allocation is required for an identified address and size granularity, then at step 405 a set determination operation is applied by the snoop control circuitry 75 to determine, from the identified address and size granularity, an index identifying a target set within a target bank of the snoop filter storage. The same process as discussed earlier with reference to FIG. 4 can be used when generating the required index to identify a set within which the new coherence data is to be allocated. Hence, considering the example of FIG. 2, at the time of allocation, then for any particular block of data, coherence data for that block may be allocated within an entry of a set in one of the banks if it relates to a cache line size block, but will be allocated into an entry of a set in the other bank if it relates to a region sized block. Further, the identified set will depend on the address, and hence whilst for one address it may be the case that coherence data for a cache line sized block is stored in bank zero whilst coherence data for a region sized block including that address is stored in bank one, for a different address the opposite may be true. Accordingly, it can be seen that coherence data of both size granularities can be spread through both of the banks shown in FIG. 2, hence enabling efficient utilisation of the snoop filter storage resources.

As shown in FIG. 5, once the target set within the target bank has been determined at step 405, then an entry in the target set is allocated to maintain the coherence data at step 410.

Figure 6A:
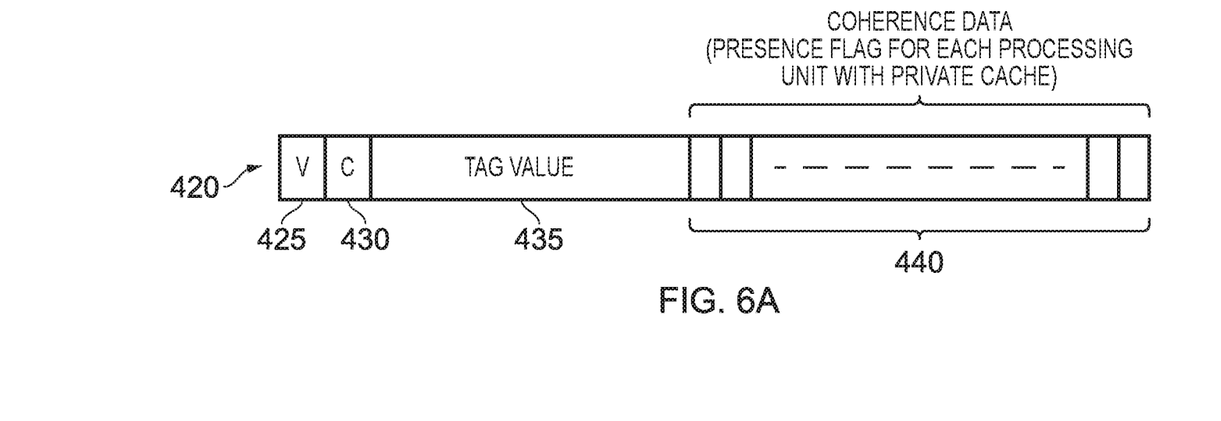
FIGS. 6A and 6B illustrate two different forms of coherence data that may be used in one example implementation.
Figure 6B:
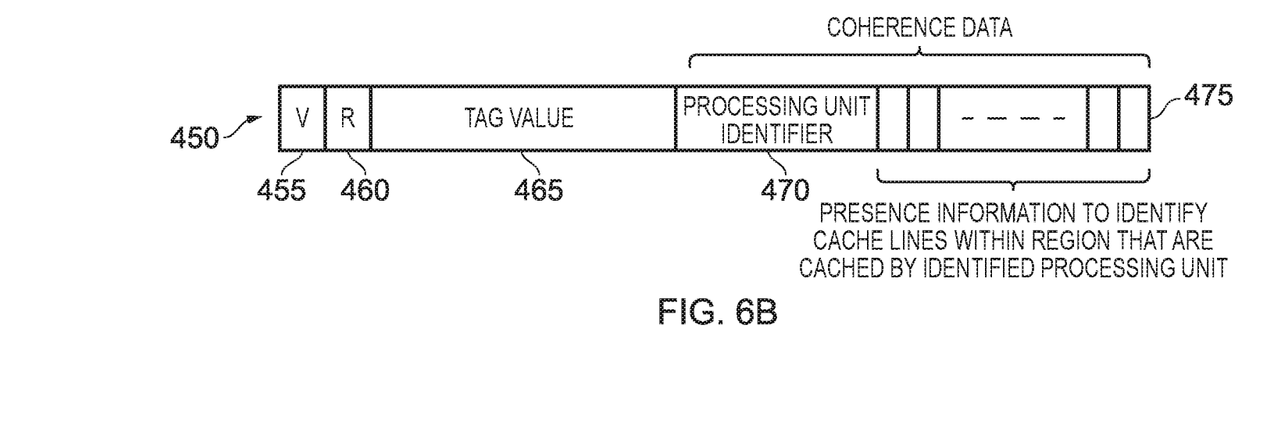

FIGS. 6A and 6B illustrate two example formats of coherence data that may be utilised. FIG. 6A shows coherence data that may be allocated for a cache line sized block of data, to keep track of which processing units have cached that data in their private caches. Hence, an entry 420 may store coherence data 440 that comprises a bit for each of the processing units with private caches, with that bit being set or clear dependent on whether that processing unit has cached the associated data, the associated data being indicated by the tag value 435 (in particular that tag value being used, in combination with the index used to identify that entry, to identify a particular cache line sized block in memory). A size granularity field 430 is also provided, which in this case is set to identify that the size granularity is a cache line size, and the valid field 425 is used to identify whether the entry stores valid coherence data or not.

In one example implementation, when the bit in the coherence data for a certain processing unit is clear, this means that it is known that that processing unit does not cache the associated data in its private cache, and accordingly does not need to be subjected to a snoop operation. Conversely, when the bit is set, then this may indicate that the associated processing unit definitely does cache the data, or alternatively may merely indicate that the associated processing unit may have a cached copy of the data, depending on how the individual bits in the coherence data are maintained. For example, the bit will be set when the processing unit first caches a copy of the data, but in some implementations it may not necessarily be cleared when the processing unit ceases caching a copy of the data. Nevertheless, in either scenario, a clear value for an associated processing unit means that that processing unit definitely does not store the data, and accordingly does not need to be subjected to the snoop operation, and hence the use of such coherence data can significantly reduce the snoop traffic required within the system.

FIG. 6B illustrates a form of coherence data that can be stored for region sized blocks. In particular, coherence data for region sized blocks can be maintained when that address region is being used solely by a single processing unit. Hence, as shown in FIG. 6B, the entry 450 may have a valid bit 455, and a size granularity bit 460 which is used in this case to identify that the coherence data relates to a region sized block of data. A tag value 465 is also provided to identify the region, and as discussed earlier this will typically comprise less bits than are provided for the equivalent tag value 435 used to identify a cache line sized block. The coherence data is then formed of two parts 470, 475. The part 470 comprises a number of bits used to identify the processing unit that is caching data for the associated memory region. If desired, a series of bits 475 can then be used to provide presence information identifying the individual cache line sized blocks within the memory region that have been cached by that identified processing unit. This can serve to reduce the snoop traffic by enabling a determination that a snoop operation is not required for an address that specifies a cache line that has not been cached within the identified processing unit.

Figure 7:
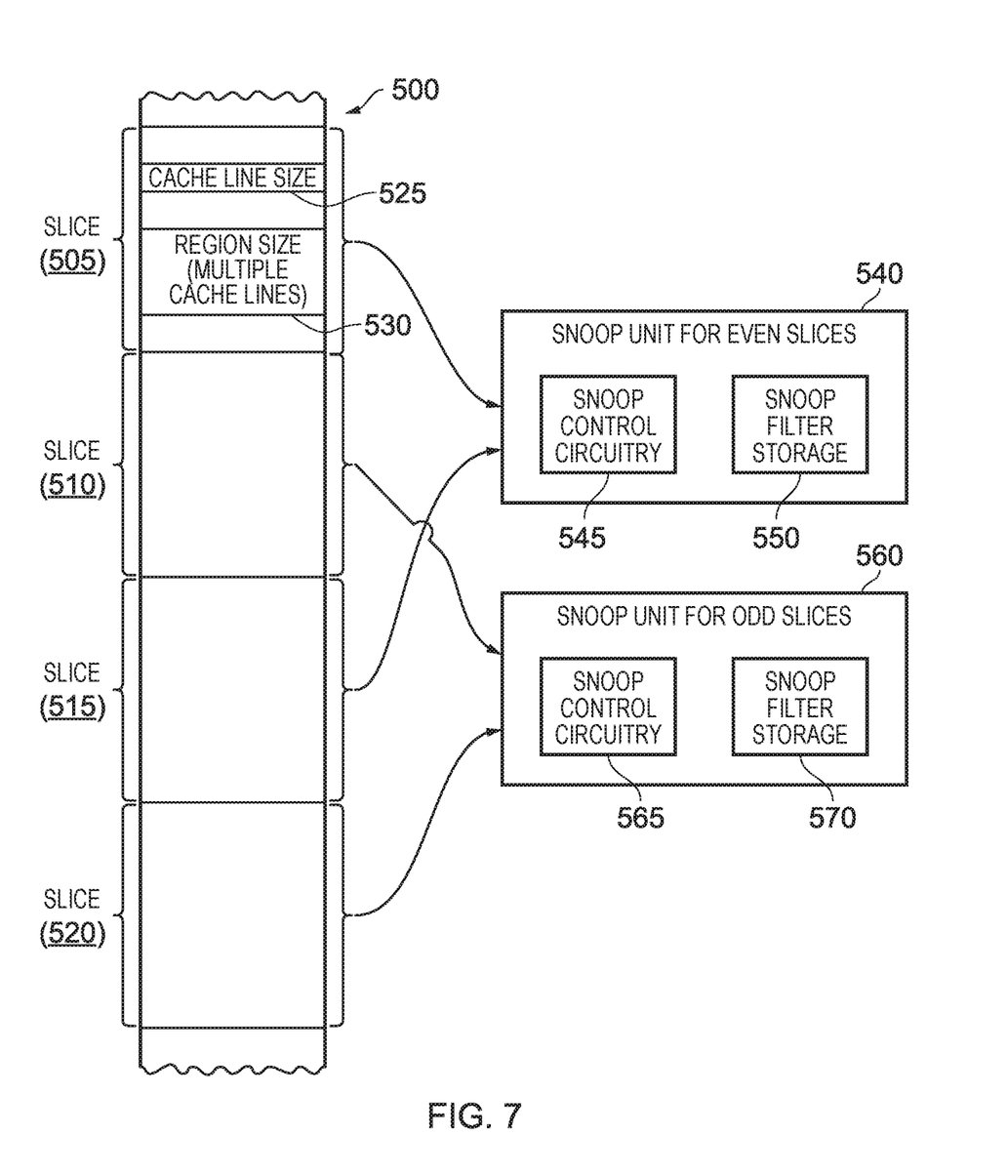
FIG. 7 illustrates how different snoop units may be used for different slices of memory, in accordance with one example implementation, with the techniques described herein being implemented in each of the provided snoop units.

As shown in FIG. 7, the techniques described herein can also be employed within a system adopting a sliced snoop circuit arrangement. As shown in FIG. 7, the memory address space 500 can be partitioned into a number of slices 505, 510, 515, 520, and multiple snoop units 540, 560 may be provided, with those snoop units each being used to manage coherency for different memory slices. Hence, each snoop unit 540, 560 may comprise snoop control circuitry 545, 565 and associated snoop filter storage 550, 570, and each of the snoop units may operate in the manner discussed earlier.

Within any particular memory slice, both cache line sized blocks 525 and region sized blocks 530 may be specified, and the associated snoop unit for that memory slice may then within its snoop filter storage store coherence data for both size granularities. To ensure that region sized memory blocks are not split between slices, and hence do not need coherence data to be monitored by more than one snoop unit, then the interleaving granularity of the slices may be arranged to be greater than the maximum size granularity of memory blocks supported within the system.

Whilst for simplicity in FIG. 7, odd slices are allocated to the first snoop unit 540 and even slices are allocated to the other snoop unit 560, there is no need for any such regular stride pattern to be used, and indeed hashing functions may be used to decide which slices map to which snoop units.

The techniques described herein enable a single snoop filter storage to store coherence data for multiple different size granularities, and provide an indexing scheme that enables simultaneous lookup of entries for those multiple size granularities. In particular, the described indexing scheme enables simultaneous lookup of entry types of different size granularities in a unified set associative structure, which reduces snoop filter request latency while maintaining a simple victim selection operation.

By supporting the provision of coherence data for multiple different size granularities whilst enabling simultaneous lookup operations to be performed for each such size granularity, this avoids any increase in snoop filter request latency, whilst enabling the use of the multiple size granularities to significantly reduce the on-chip storage requirements for the snoop filter. Indeed, in some example implementations such a design could save half of the snoop filter storage space with minimal impact to cache performance. Alternatively, the snoop filter storage could be retained at an equivalent size to that that would be used were each entry to only be used for cache line sized memory blocks, but with a significant reduction in the likelihood of evictions being required. Reducing the requirement for entries in the snoop filter storage to be evicted can significantly improve performance. In particular, if an entry needs to be evicted from the snoop filter storage, this can have a significant impact on performance, since it is then necessary to perform back-invalidation operations in all of the local caches that currently store data for the address whose coherence data is going to be evicted from the snoop filter storage (as the local caches cannot store data that is not being tracked by the snoop filter storage).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus to receive requests from a plurality of processing units, where multiple of the plurality of processing units have associated cache storage, the apparatus comprising:
   a snoop unit to implement a cache coherency protocol when a request received by the apparatus identifies a cacheable address within memory;
   the snoop unit having snoop filter storage comprising an N-way set associative storage structure having a plurality of entries, where each entry is used to store coherence data for an associated address range identifying a memory block, and the coherence data is used to determine which cache storages provided within the multiple of the plurality of processing units need to be subjected to a snoop operation when implementing the cache coherency protocol in response to a received request specifying an address within the associated address range;
   wherein:
   the snoop filter storage is arranged to store coherence data for memory blocks of at least a plurality P of different size granularities;
   the snoop filter storage is organised as a plurality of banks that are accessible in parallel, wherein the plurality of banks comprises at least P banks, and each bank comprises entries within each of the N ways of the snoop filter storage; and
   the snoop unit further comprises snoop control circuitry to control access to the snoop filter storage, wherein the snoop control circuitry is responsive to a received address to create from the received address a group of indexes, the group of indexes comprising an index for each different size granularity amongst the P different size granularities, and each index in the group being constrained so as to identify an entry in a different bank of the snoop filter storage to the bank containing the entry identified by any other index in the group; and
   the snoop control circuitry is arranged to use the group of indexes to perform a lookup operation in parallel within the snoop filter storage in order to determine, taking into account each of the different size granularities amongst the P different size granularities, whether an entry stores coherence data for the received address.

2. An apparatus as claimed in claim 1, wherein each index in the group of indexes comprises one or more bank specifying bits, and the snoop control circuitry is arranged to manipulate the one or more bank specifying bits to ensure that each index in the group identifies an entry in a different bank of the snoop filter storage to the bank containing the entry identified by any other index in the group.

3. An apparatus as claimed in claim 1, wherein the different size granularities comprise a first size corresponding to a cache line size, and at least one further size corresponding to a multiple of the cache line size.

4. An apparatus as claimed in claim 3, wherein:
the received address has an index portion comprising a plurality of bits and a tag portion comprising a plurality of further bits;
the snoop control circuitry is arranged to generate the index for the first size using the plurality of bits of the index portion of the received address; and
the snoop control circuitry is arranged, for each further size, to use a subset of the plurality of bits of the index portion, along with one or more of the further bits of the tag portion, to generate an initial index for the further size that has the same number of bits as the index for the first size, and to then manipulate one or more bank specifying bits in the generated indexes to ensure that each index in the group of indexes identifies a different bank to each other index in the group of indexes.

5. An apparatus as claimed in claim 4, wherein, for each initial index, the snoop control circuitry is arranged to manipulate the one or more bank specifying bits in that initial index in order to generate a final index used as the index for the corresponding further size in the group of indexes.

6. An apparatus as claimed in claim 4, wherein, for each further size, the snoop control circuitry is arranged to replace one or more least significant bits of the index portion of the received address with a corresponding number of further bits from the tag portion of the received address in order to generate the initial index for that further size.

7. An apparatus as claimed in claim 6, wherein the one or more bank specifying bits in each initial index are copied from corresponding bits in the index for the first size.

8. An apparatus as claimed in claim 7, wherein the one or more bank specifying bits are one or more most significant bits in the index for the first size.

9. An apparatus as claimed in claim 7, wherein:
the different size granularities comprise the first size and a single further size;
the one or more bank specifying bits comprise a single bank specifying bit; and
the snoop control circuitry is arranged to manipulate the single bank specifying bit by inverting a value of the single bank specifying bit in either the index for the first size or the initial index for the further size.

10. An apparatus as claimed in claim 1, wherein each entry includes a granularity field used to identify the size granularity that the coherence data stored in that entry relates to.

11. An apparatus as claimed in claim 1, wherein:
the snoop control circuitry is arranged in response to detecting that an allocation is required for an identified address and size granularity, to control allocation, in the snoop filter storage, of an entry to maintain coherence data for the identified address and size granularity; and
the snoop control circuitry is arranged to apply a set determination operation to determine, from the identified address and the size granularity, an index identifying a target set within a target bank of the snoop filter storage from which the allocated entry is to be selected, where the set determination operation is such that, for any identified address, the target bank differs depending on the size granularity, but with the target bank for any particular size granularity being dependent on the identified address.

12. An apparatus as claimed in claim 1, wherein the plurality of banks comprises K×P banks, where K is an integer of one or more.

13. An apparatus as claimed in claim 3, wherein:
within an entry in the snoop filter storage used to maintain coherence data for a cache line size memory block, the coherence data provides a presence flag for each of the multiple processing units to identify when the cache storage of that processing unit is known not to hold a copy of the data within the associated address range.

14. An apparatus as claimed in claim 3, wherein:
within an entry in the snoop filter storage used to maintain coherence data for a further size corresponding to a multiple of the cache line size, the coherence data provides an indication of a single processing unit amongst the multiple processing units that currently has private access to the data within the associated address range.

15. An apparatus as claimed in claim 14, wherein the coherence data further comprises presence information identifying which cache line size memory blocks within the associated address range are currently cached by the single processing unit.

16. An apparatus as claimed in claim 1, further comprising:
at least one additional snoop unit arranged to operate in combination with the snoop unit to provide sliced snoop circuitry, wherein a memory address space is considered as a plurality of slices and each slice is associated with one snoop unit selected from amongst the snoop unit and the at least one additional snoop unit; and
an interleaving granularity of the slices is greater than or equal to a maximum size granularity amongst the different size granularities of the memory blocks.

17. An apparatus as claimed in claim 16, wherein each additional snoop unit has a same form as the snoop unit.

18. A method of maintaining, within an apparatus, coherence data for memory blocks of different size granularities, comprising:
receiving at the apparatus requests from a plurality of processing units, where multiple of the plurality of processing units have associated cache storage;
employing a snoop unit to implement a cache coherency protocol when a request received by the apparatus identifies a cacheable address within memory;
providing snoop filter storage comprising an N-way set associative storage structure having a plurality of entries;
employing each entry in the snoop filter storage to store coherence data for an associated address range identifying a memory block, where the coherence data is used to determine which cache storages provided within the multiple of the plurality of processing units need to be subjected to a snoop operation when implementing the cache coherency protocol in response to a received request specifying an address within the associated address range;
arranging the snoop filter storage to store coherence data for memory blocks of at least a plurality P of different size granularities;
organising the snoop filter storage as a plurality of banks that are accessible in parallel, wherein the plurality of banks comprises at least P banks, and each bank comprises entries within each of the N ways of the snoop filter storage; and employing snoop control circuitry to control access to the snoop filter storage, wherein the snoop control circuitry, responsive to a received address, creates from the received address a group of indexes, the group of indexes comprising an index for each different size granularity amongst the P different size granularities, and each index in the group being constrained so as to identify an entry in a different bank of the snoop filter storage to the bank containing the entry identified by any other index in the group; and using the group of indexes to perform a lookup operation in parallel within the snoop filter storage in order to determine, taking into account each of the different size granularities amongst the P different size granularities, whether an entry stores coherence data for the received address.

19. An apparatus to receive requests from a plurality of processing units, where multiple of the plurality of processing units have associated cache storage, the apparatus comprising:

snoop means for implementing a cache coherency protocol when a request received by the apparatus identifies a cacheable address within memory;

the snoop means having snoop filter storage means comprising an N-way set associative storage structure having a plurality of entries, where each entry is used to store coherence data for an associated address range identifying a memory block, and the coherence data is used to determine which cache storages provided within the multiple of the plurality of processing units need to be subjected to a snoop operation when implementing the cache coherency protocol in response to a received request specifying an address within the associated address range;

wherein:

the snoop filter storage means is for storing coherence data for memory blocks of at least a plurality P of different size granularities;

the snoop filter storage means is organised as a plurality of banks that are accessible in parallel, wherein the plurality of banks comprises at least P banks, and each bank comprises entries within each of the N ways of the snoop filter storage means; and the snoop means further comprises snoop control means for controlling access to the snoop filter storage means, wherein the snoop control means is responsive to a received address to create from the received address a group of indexes, the group of indexes comprising an index for each different size granularity amongst the P different size granularities, and each index in the group being constrained so as to identify an entry in a different bank of the snoop filter storage to the bank containing the entry identified by any other index in the group; and the snoop control means is arranged to use the group of indexes to perform a lookup operation in parallel within the snoop filter storage means in order to determine, taking into account each of the different size granularities amongst the P different size granularities, whether an entry stores coherence data for the received address.

* * * * *